US012725213B2

(12) United States Patent
Waite

(10) Patent No.: US 12,725,213 B2
(45) Date of Patent: Sep. 1, 2026

(54) RESTAURANT MENU CUSTOMIZATION USING COMPUTER VISION AND NATURAL LANGUAGE PROCESSING

(71) Applicant: INTERNATIONAL BUSINESS MACHINES CORPORATION, Armonk, NY (US)

(72) Inventor: Tyler Waite, Lake Washington, WA (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 18/788,300

(22) Filed: Jul. 30, 2024

(65) Prior Publication Data

US 2026/0038062 A1 Feb. 5, 2026

(51) Int. Cl.
*G06Q 50/12* (2012.01)
*G06K 7/14* (2006.01)

(52) U.S. Cl.
CPC ........... *G06Q 50/12* (2013.01); *G06K 7/1417* (2013.01)

(58) Field of Classification Search
CPC ............................. G06Q 50/12; G06K 7/1417
See application file for complete search history.

(56) References Cited

U.S. PATENT DOCUMENTS

2003/0158465 A1* 8/2003 Galli ...................... G16H 20/60 600/300
2014/0380286 A1* 12/2014 Gabel ....................... G06F 8/20 717/139
2019/0000382 A1 1/2019 Fitzpatrick
2019/0295440 A1 9/2019 Hadad
2020/0098466 A1 3/2020 Murdoch et al.
2020/0342550 A1 10/2020 Halimsaputera
2021/0398185 A1* 12/2021 Hershey ............. G06Q 30/0621
2022/0012825 A1* 1/2022 Yahata ............... G06Q 30/0635

FOREIGN PATENT DOCUMENTS

WO WO-2018054124 A1 * 3/2018 ............ G06F 16/00

OTHER PUBLICATIONS

Retrieved from the Internet on May 9, 2024: https://brandfolder.com/workbench/extract-text-from-image, 6 pages.

(Continued)

*Primary Examiner* — A. Hunter Wilder
(74) *Attorney, Agent, or Firm* — CHIP LAW GROUP

(57) ABSTRACT

An approach is provided for customizing a restaurant menu. Dietary restrictions of a user are received. Text is extracted from a digital version of a menu of a restaurant. Ingredient(s) of a first menu item are identified within the extracted text. Using natural language processing (NLP), it is determined that the ingredient(s) include at least one ingredient that does not comply with the dietary restrictions. Ingredient(s) of a second menu item are identified within the extracted text. Using NLP, it is determined that the ingredient(s) of the second menu item comply with the dietary restrictions. Based on the at least one ingredient being in non-compliance and the ingredient(s) of the second menu item being in compliance, a digital menu is generated that includes the second menu item, but does not include the first menu item. The digital menu is displayed to the user.

16 Claims, 10 Drawing Sheets

(56) References Cited

OTHER PUBLICATIONS

Adam Reiner, The Case for Preserving QR Code Menus, Apr. 27, 2021,Retrieved from the Internet on May 9, 2024: https://www.restaurantmanifesto.com/preserving-qr-code-menus/, 8 pages.
The Allergy Mom, Kosher Labeling Demystified: Kosher Labels and their Significance for Food Allergies, Retrieved from the Internet on May 9, 2024: https://theallergymom.com/kosher-labeling-demystified-kosher-labels-and-their-significance-for-food-allergies/, 9 pages.
Author credit line ID 91350275, Retrieved from the Internet on May 9, 2024: https://www.dreamstime.com/stock-illustration-food-allergen-icons-set-safety-allergy-ingredients-must-be-declared-as-allergens-eu-eps-vector-useful-restaurants-image91350275#_, 3 pages.
Official Website of the YouTube Channel 'Restaurant Recipe Recreations' Retrieved from the Internet on May 9, 2024: https://www.restaurantreciperecreations.com/, 19 pages.
Johan et al., "Allergen Recognition in Food Ingredients with Computer Vision", Ultima Computing : Jurnal Sistem Komputer, vol. 13, No. 2, Dec. 2021, 6 pages.
Mishra et al., "Allergen30: Detecting Food Items with Possible Allergens Using Deep Learning-Based Computer Vision", Food Analytical Methods, Jul. 2022, pp. 3045-3078.
Sundhoro et al., "Rapid and accurate electrochemical sensor for food allergen detection in complex foods", Scientific Reports 11.1, 2021, 9 pages.

* cited by examiner

COMPUTER 101
PROCESSOR SET 110
PROCESSING CIRCUITRY 120
CACHE 121
COMMUNICATION FABRIC 111
VOLATILE MEMORY 112
PERSISTENT STORAGE 113
OPERATING SYSTEM 122
CODE FOR RESTAURANT MENU CUSTOMIZATION 200
PERIPHERAL DEVICE SET 114
UI DEVICE SET 123
STORAGE 124
IoT SENSOR SET 125
NETWORK MODULE 115
END USER DEVICE 103
WAN 102
REMOTE SERVER 104
REMOTE DATABASE 130
PRIVATE CLOUD 106
GATEWAY 140
PUBLIC CLOUD 105
CLOUD ORCHESTRATION MODULE 141
HOST PHYSICAL MACHINE SET 142
VIRTUAL MACHINE SET 143
CONTAINER SET 144

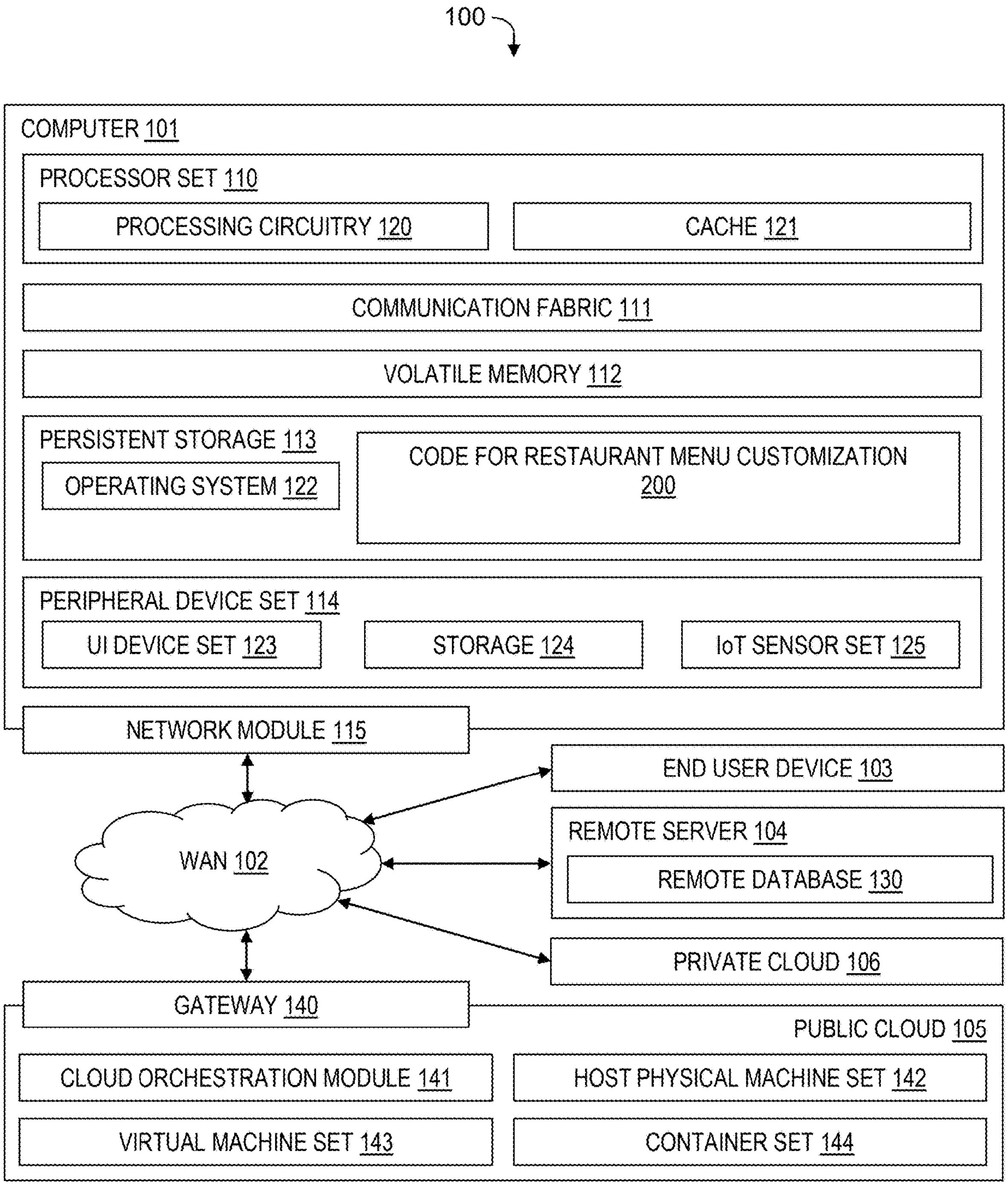

*FIG. 1*

RESTAURANT MENU CUSTOMIZATION USING COMPUTER VISION AND NATURAL LANGUAGE PROCESSING

BACKGROUND

The present invention relates to restaurant menu customization, and more particularly to customizing a restaurant menu based on dietary restrictions.

SUMMARY

In one embodiment, the present invention provides a computer-implemented method. The method includes receiving information about dietary restrictions of a user via a profile in a software application. The method further includes extracting, by a processor set, text from a digital version of a menu of a restaurant. The method further includes identifying one or more ingredients of a first menu item within the extracted text, the first menu item being included in the menu of the restaurant. The method further includes determining, by the processor set and using natural language processing (NLP), that the identified one or more ingredients of the first menu item includes at least one ingredient that does not comply with the dietary restrictions of the user. The method further includes identifying one or more ingredients of a second menu item within the extracted text, the second menu item being included in the menu of the restaurant. The method further includes determining, by the processor set and using NLP, that the identified one or more ingredients of the second menu item comply with the dietary restrictions of the user. The method further includes, based on the at least one ingredient included in the identified one or more ingredients of the first menu item not complying with the dietary restrictions and the one or more ingredients of the second menu item complying with the dietary restrictions, generating, by the processor set, a digital menu that includes the second menu item, but does not include the first menu item. The method further includes displaying the digital menu to the user for ordering one or more menu items included in the digital menu.

A computer system and a computer program product corresponding to the above-summarized computer-implemented method are also described herein.

BRIEF DESCRIPTION OF THE DRAWINGS

FIG. 1 is a block diagram of a system for customizing a restaurant menu using computer vision and natural language processing, in accordance with embodiments of the present invention.

DETAILED DESCRIPTION

Overview

Figure 2:
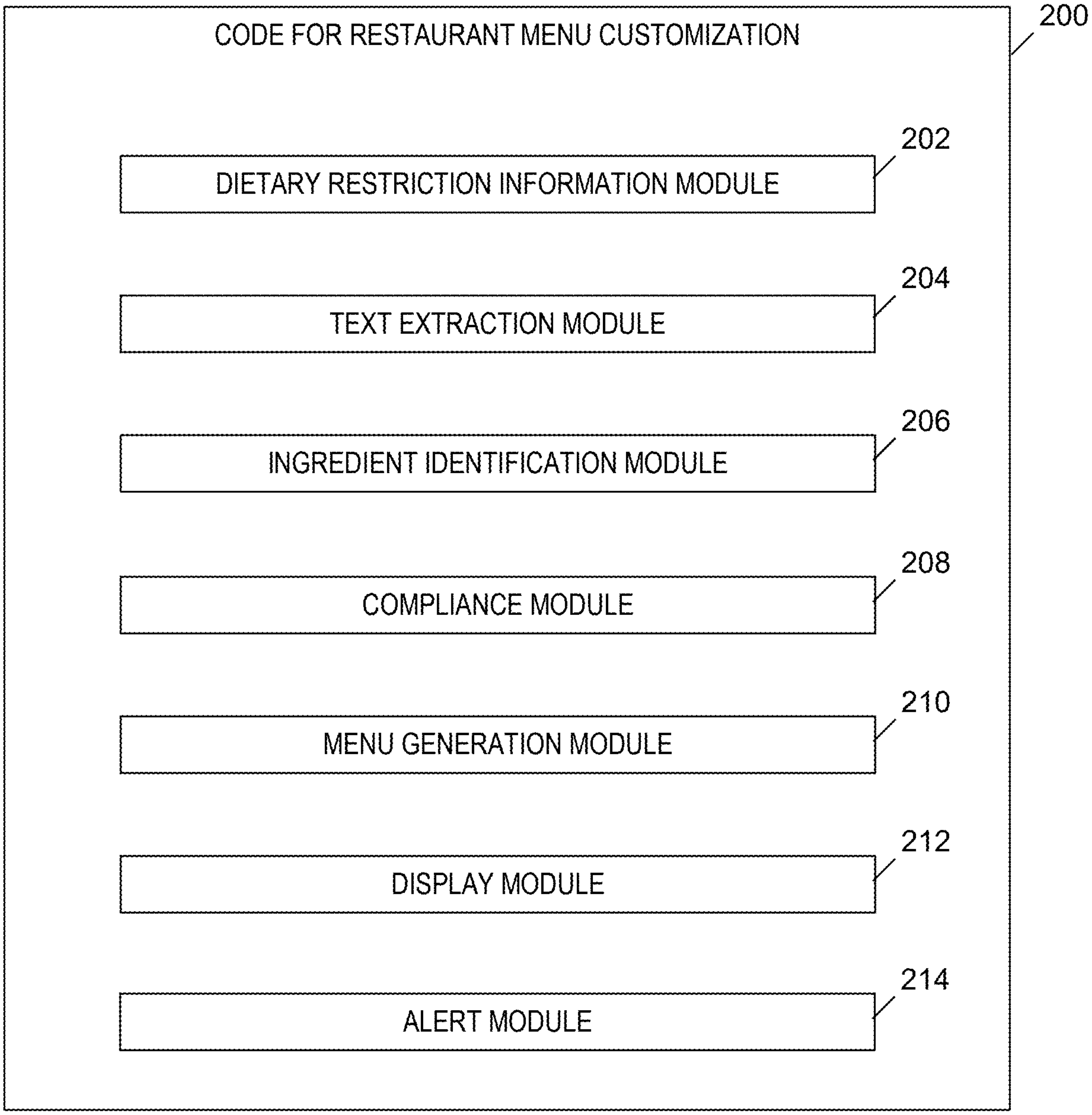
FIG. 2 is a block diagram of modules included in code included in the system of FIG. 1, in accordance with embodiments of the present invention.

People have a variety of dietary restrictions based on medical conditions (e.g., celiac disease, Crohn's disease, or diabetes), allergies (e.g., shellfish or nuts), and/or dietary preferences (e.g., vegan). Known techniques to address dietary restrictions of restaurant patrons include restaurants using text or icons on menus to identify a subset of the menu items that are acceptable for people with certain common dietary restrictions, but this practice is not as widespread as it could be. Adding text or icons on restaurant menus to identify acceptable items relative to all possible dietary restrictions or even a substantial number of dietary restrictions can make the menu cluttered and more difficult to peruse. In the case of a restaurant menu that lacks the aforementioned identifying text and/or icons, a patron relies on the knowledge and competence of the wait staff to (i) correctly identify which menu items comply with the patron's dietary restrictions and/or (ii) correctly communicate to the cook any menu item adjustments that are needed to comply with the patron's dietary restrictions. In the case of the aforementioned patron's reliance on the wait staff, human error on the part of the wait staff can result in the patron accidentally consuming foods that are not in compliance with the patron's dietary restrictions, thereby causing emotional, existential, and physical pain and distress.

Embodiments of the present invention address the aforementioned unique challenges by using computer vision and natural language processing (NLP) to transform an initial restaurant menu into a new restaurant menu that is customized for a user's dietary restrictions. The customization includes listing menu items from the initial restaurant menu that are identified as complying with the user's dietary restrictions, while not listing any menu items from the initial restaurant menu that are identified as not complying with the user's dietary restrictions. In one embodiment, computer vision is used to extract text from a physical menu which is the initial restaurant menu. In one embodiment, NLP is used to identify terms and ingredients in text included in or extracted from the initial restaurant menu and to identify menu items that have ingredients that do not comply with the user's dietary restrictions based on the identified terms and ingredients.

Implementing the restaurant menu customization technique disclosed herein allows restaurant customers who have dietary restrictions to identify menu options to choose from more quickly than was possible with non-customized menus. Further, restaurant owners can quickly determine how many items on their menu are suitable for various customer demographics. Still further, the restaurant menu customization technique disclosed herein reduces a risk of allergic reactions in restaurant customers, thereby reducing staff and customer disruptions related to an allergic reaction happening while the customer is at the restaurant, and also reducing a risk of legal action related to customers who experience an allergic reaction related to a menu item. Customers who have dietary restrictions and who avoided a restaurant in the past due to the former use of a traditional restaurant menu not identifying compliant menu items may now visit the restaurant because the customized restaurant menu is available, thereby increasing customer volume for the restaurant. Still further, with the customized restaurant menu, customers have a reduced need to ask wait staff and cooks about menu item ingredients, thereby increasing the efficiency of ordering menu items.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for customizing a restaurant menu using computer vision and natural language processing, in accordance with embodiments of the present invention. Computing environment 100 contains an example of an environment for the execution of at least some of the computer code involved in performing the inventive methods, such as code 200 for restaurant menu customization. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

System and Process for Customizing a Restaurant Menu

FIG. 2 is a block diagram of modules included in code 200 included in the system of FIG. 1, in accordance with embodiments of the present invention. Code 200 includes a dietary restriction information module 202, a text extraction module 204, an ingredient identification module 206, a compliance module 208, a menu generation module 210, and a display module 212.

Dietary restriction information module 202 is configured to receive information about dietary restrictions of a user. In one embodiment, a user of a software application (hereinafter, also referred to as an app) enters the dietary restriction information via a profile provided in the app. In one embodiment, the dietary restrictions include restrictions based on dietary preferences (e.g., vegan, vegetarian, and pescatarian), medical conditions (e.g., celiac disease, Crohn's disease, diabetes, high cholesterol, and conditions, such as kidney disease, heart disease, and high blood pressure, for which a low sodium diet is prescribed), and food allergies (e.g., celery, cereals containing gluten, crustaceans, eggs, fish, lupin, milk, mollusks, mustard, tree nuts, peanuts, sesame, soya, and sulphites).

Text extraction module 204 is configured to use screen scraping software tools and algorithms to extract text and icons from an online restaurant menu accessed via a quick-response (QR) code. The user utilizes a camera included in the device running the app to capture the QR code and obtain a hyperlink to the online restaurant menu. Text extraction module 204 is configured to load the online menu into the app by using the aforementioned hyperlink. In one embodiment, text extraction module 204 uses screen scraping software tools to extract data from the Hypertext Markup Language (HTML) code used to create a webpage that includes the online restaurant menu.

Text extraction module 204 is further configured to use a computer vision software tool and computer vision algorithms to extract text from an image of a physical restaurant menu, where the user utilizes the app and a camera included in the device executing the app to capture the image of the physical restaurant menu. In one embodiment, the user uses the app to upload an image of the restaurant menu or a document (e.g., a .pdf document) and text extraction module 204 pulls text from the image or document.

Ingredient identification module 206 is configured to identify menu items in the text extracted by the text extraction module 204 and determine whether the identified menu items include respective lists of ingredients. If lists of ingredients are not included in the identified menu items, ingredient identification module 206 determines lists of ingredients for the menu items by searching for online recipes for the menu items.

Compliance module 208 uses natural language processing (NLP) tools to analyze the lists of ingredients for the menu items to identify ingredients and menu items that do not comply with the user's dietary restrictions. For example, compliance module 208 determines that menu item XYZ does not comply with dietary restrictions for User A because menu item XYZ lists ingredients including ingredient B and compliance module 208 has determined that ingredient B does not comply with the dietary restrictions.

Menu generation module 210 is configured to receive (i) a first selection for generating and displaying a digital menu that hides non-compliant menu item(s) (i.e., a selection for generating and displaying a digital menu that includes menu item(s) whose ingredient(s) comply with the user's dietary restrictions, but does not include (i.e., hides) menu item(s) that include at least one ingredient that does not comply with the user's dietary restrictions) or (ii) a second selection for generating and displaying a digital menu that shows the non-compliant menu item(s) (i.e., a selection for generating and displaying a digital menu that includes both the compliant menu item(s) and the non-compliant menu item(s), and includes visual indicators that indicate the menu item(s) and/or ingredient(s) that do not comply with the user's dietary restrictions).

As used herein, a compliant menu item is a menu item whose ingredients comply with the user's dietary restrictions and a non-compliant menu item is a menu item that includes at least one ingredient that does not comply with the user's dietary restrictions.

Menu generation module 210 is further configured to generate, in response to receiving the aforementioned first selection, a first digital menu that includes menu item(s) whose ingredients(s) comply with the user's dietary restrictions, but does not include other menu item(s) for which any ingredient is not compliant with the user's dietary restrictions.

Menu generation module 210 is further configured to generate, in response to receiving the aforementioned second selection, a second digital menu that includes all the menu items (i.e., the menu item(s) that comply and the other menu item(s) that do not comply with the user's dietary restrictions) and includes visual indicators that indicate menu item(s) and/or ingredient(s) that do not comply with the user's dietary restrictions.

Display module 212 is configured to display the aforementioned first digital menu in response to receiving the aforementioned first selection. Display module 212 is further configured to display the aforementioned second digital menu in response to receiving the aforementioned second selection.

Alert module 214 is configured to generate and display an alert in response to an occurrence of a trigger event. For example, an occurrence of a trigger event includes: compliance module 208 determining that menu item M includes a non-compliant ingredient I (i.e., determining that ingredient I is an ingredient included in a predetermined restricted list of ingredients for a particular dietary restriction of the user). In response to the occurrence of the aforementioned trigger event, alert module 214 generates the alert: "The description of M contains I. Ask the wait staff if M can be made without I or if I can be replaced with something else." In this example, menu generation module 210 generates a full menu so that a display of menu item M is in proximity to a selectable visual indicator V. Display module 212 displays the full menu on a device operated by the user, so that menu item M is displayed in proximity to visual indicator V. Alert module 214 receives a selection of visual indicator V by the user via the device, and in response, alert module 214 displays the alert on the device. Other examples of trigger events and their respective alerts are described below in the discussion of FIGS. 3A-3B.

The functionality of the modules included in code 200 is described in more detail in the discussions presented below relative to FIGS. 3A-3B, FIG. 4, FIG. 5, FIG. 6, FIG. 7, FIG. 8, and FIG. 9.

Figure 3A:
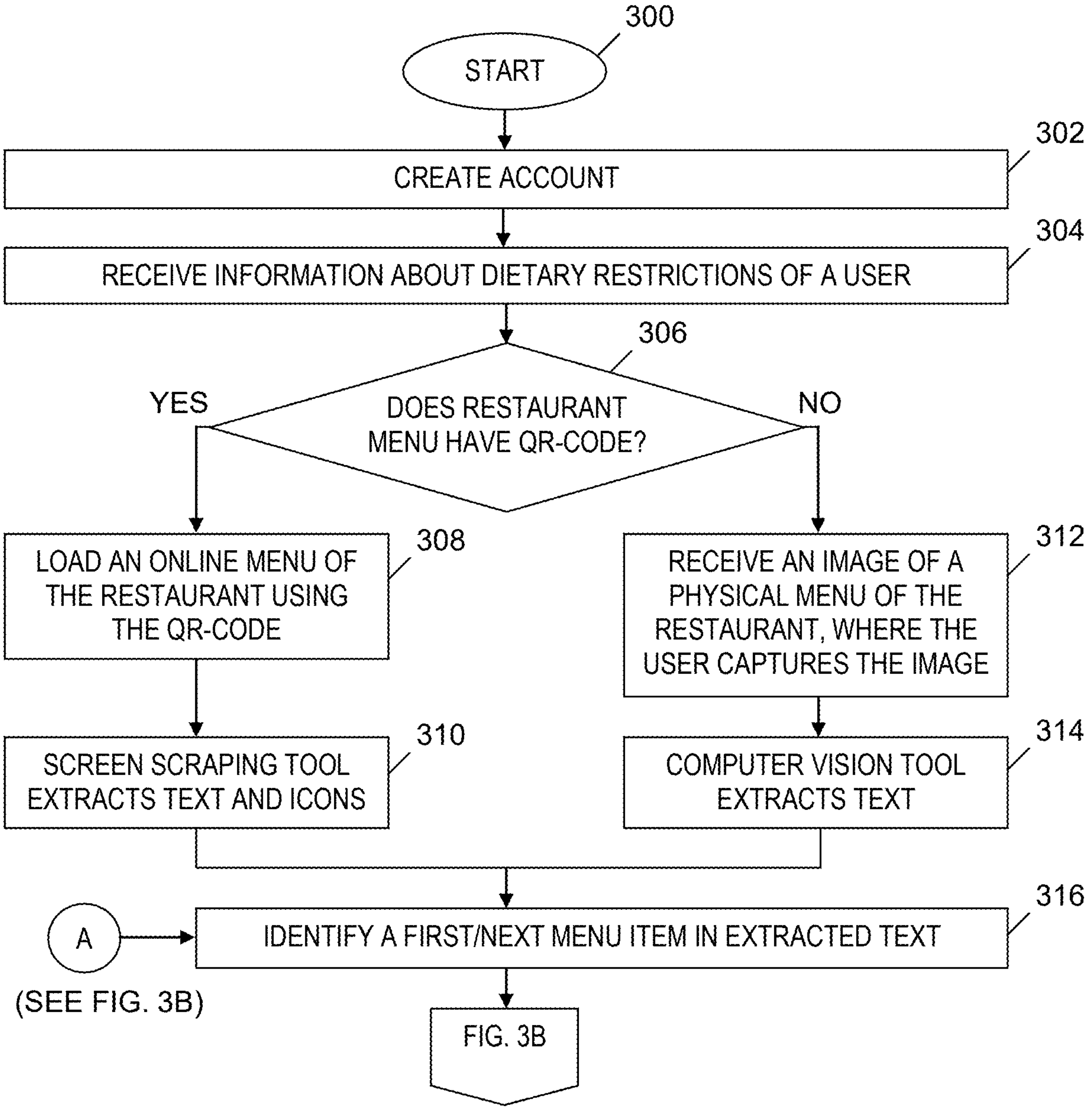
FIGS. 3A-3B depict a flowchart of a process of customizing a restaurant menu using computer vision and natural language processing, where operations of the flowchart are performed by modules in FIG. 2, in accordance with embodiments of the present invention.
Figure 3B:
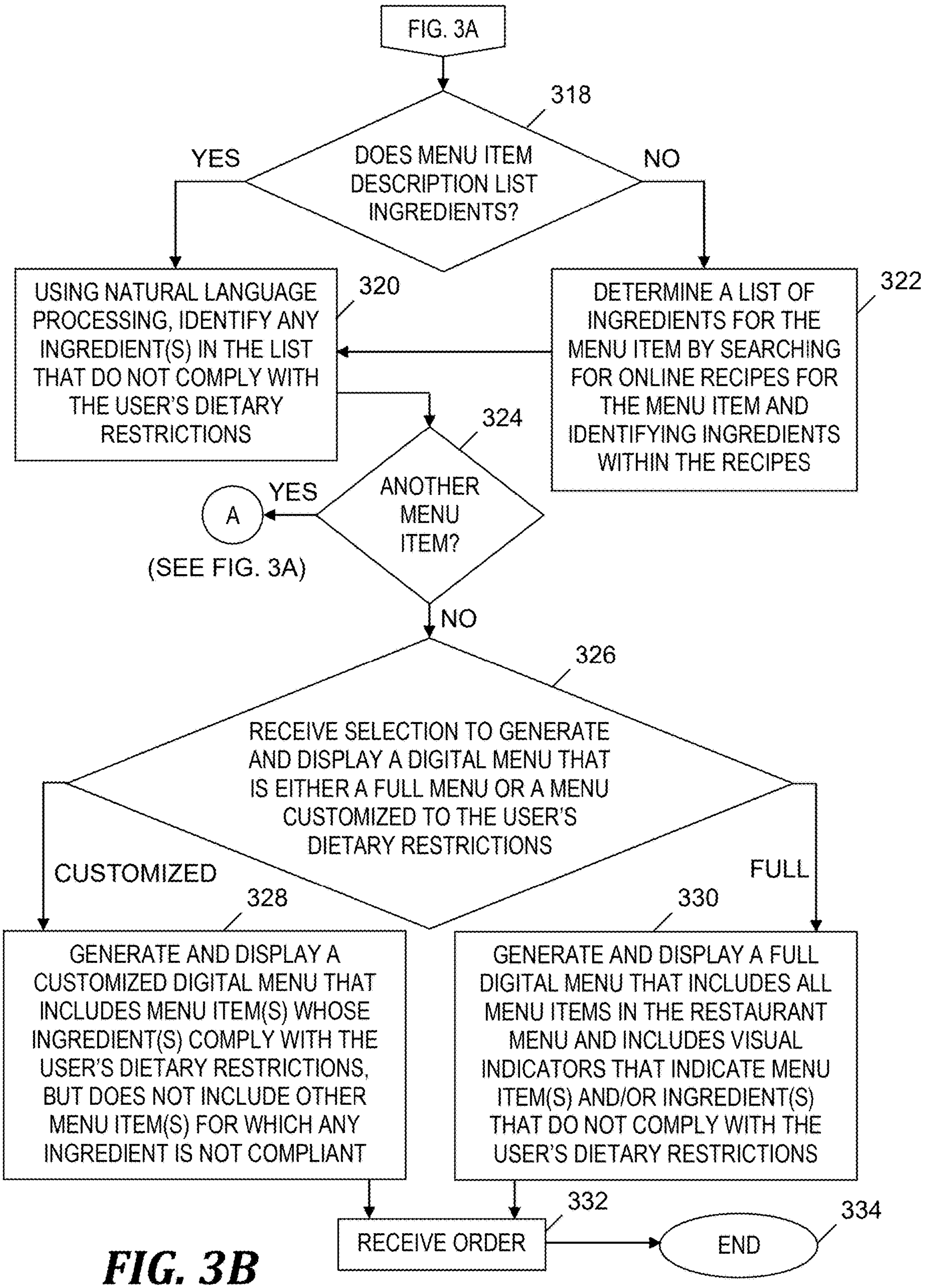

FIGS. 3A-3B depict a flowchart of a process of customizing a restaurant menu using computer vision and natural language processing, where operations of the flowchart are performed by modules in FIG. 2, in accordance with embodiments of the present invention. The process of FIG. 3 begins at a start node 300. In step 302, a user utilizes a device to create a user account in an app being executed on the device.

In step 304, dietary restriction information module 202 receives information about dietary restrictions of the user via information the user entered in a profile provided by the app. For example, the app can provide a profile entry page that allows a user to enter the user's name and mark checkboxes next to particular dietary restrictions that apply to the user. In one embodiment, the app includes a feature that allows the user to opt-in or opt-out of permitting the app to utilize the dietary restriction information entered in the profile.

In step 306, the user, after going to a restaurant, determines whether the menu of the restaurant has a QR code. For example, printed material displayed in the restaurant for viewing by patrons of the restaurant may include the QR code of the menu of the restaurant.

If the restaurant menu has a QR code as determined by step 306, then the Yes branch of step 306 is followed and step 308 is performed. In step 308, the user utilizes a camera feature included in a device (e.g., smartphone) to scan the QR code to obtain a hyperlink and then utilizes the device to load an online version of the restaurant menu to the app by using the hyperlink. Hereinafter, the online version of the restaurant menu is referred to simply as the online menu.

In step 310, text extraction module 204 uses a screen scraping tool to extract text and icons from the online menu. The extracted text includes menu items included in the menu of the restaurant. The steps that follow step 310 are discussed below after a discussion of the No branch of step 306.

Returning to step 306, if the restaurant does not have a QR code, then the No branch of step 306 is followed and step 312 is performed. In step 312, the app receives an image of a physical menu of the restaurant, where the user utilizes the camera feature of a device to capture the image.

In step 314, text extraction module 204 uses a computer vision tool or a text extractor tool to extract text from the image received in step 312. The extracted text includes menu items included in the menu of the restaurant.

In one embodiment, the app includes an on-screen selection for the user to activate to cause the device to scan a QR code in step 308 and further includes another on-screen selection for the user to activate to cause the device to take a picture of a physical menu in step 312.

Step 316 begins a loop and follows both step 310 and step 314. The loop processes a given menu item included in multiple menu items included in the text extracted in step 310 or step 314. Hereinafter, the text extracted in step 310 or step 314 is referred to as the extracted text. In step 316, text extraction module 204 identifies a first menu item or a next menu item included in the multiple menu items included in the extracted text. A first menu item is identified if step 316 is being performed for a first time through the aforementioned loop. A next menu item is identified if step 316 is being performed for a subsequent time through the aforementioned loop. Text extraction module 204 identifies the first menu item or next menu item within the extracted text. Following step 316, the process of FIGS. 3A-3B continues with step 318 in FIG. 3B.

In step 318, ingredient identification module 206 determines whether a description included in the menu item includes a list of ingredients for the menu item, where the menu item is being processed in the aforementioned loop. In one embodiment, step 318 is performed by using NLP. If ingredient identification module 206 determines that the description in the menu item includes a list of ingredients, then the Yes branch of step 318 is followed and step 320 is performed. In step 320, compliance module 208 uses NLP to identify any ingredient(s) in the list of ingredients that do not comply with the user's dietary restrictions, and further uses NLP to identify ingredient(s) that comply with the user's dietary restrictions.

In one embodiment, compliance module 208 searches a database that associates non-compliant ingredients with different categories of dietary restrictions, and step 320 includes compliance module 208 determining whether any of the ingredient(s) in the list of ingredients match a non-compliant ingredient in the database, and whether the category in the database associated with the matched non-compliant ingredient matches the particular dietary restriction of the user.

Furthermore, in step 320, compliance module 208 analyzes the extracted text to identify other words that are not ingredients, but indicate that a menu item is compliant or non-compliant. For example, the extracted text includes words from the restaurant menu that simply label an entire menu item as "vegan," and therefore, compliance module 208 does not have to further analyze the ingredients of that menu item with regard to whether the ingredients do not comply with a vegan dietary restriction.

The steps that follow step 320 are described below after a discussion of the No branch of step 318.

In an alternative embodiment, step 318 is modified to include ingredient identification module 206 determining whether a description included in the menu item does not include a list of ingredients for the menu item or the extracted text includes an incomplete list of ingredients for the given menu item. The determination that the extracted text includes only an incomplete list of ingredients can be based on, for example, ingredient identification module 206 recognizing text in the extracted text that states or otherwise indicates that the list of ingredients for the menu item is (or may be) an incomplete list of ingredients.

If ingredient identification module 206 determines in step 318 that the description in the menu item does not include a list of ingredients for the menu item, then the No branch of step 318 is followed and step 322 is performed. In step 322, in response to determining that the menu item description does not include the list of ingredients for the menu item, ingredient identification module 206 identifies ingredients to include in a complete list of ingredients for the menu item, where the ingredient identification for the list is performed by the app generating and executing an online search query to perform a web search for, identify, and analyze online recipes for the menu item. Alternatively, ingredient identification module 206 identifies the ingredients by searching a database of recipes stored in a data repository. In one embodiment, ingredient identification module 206 searches particular recipe or cooking websites that list ingredients for recipes (e.g., a website that lists ingredients for signature dishes at popular restaurants). In one embodiment, the search for online recipes is based on a search for recipes whose names are the same or similar to the name of the menu item included in the extracted text. Determining a similarity between the name of the menu item and the name of a recipe found in the online search can be based on text analysis using cosine similarity.

Based on the identified online recipes, ingredient identification module 206 determines the complete list of ingredients for the menu item. After step 322, step 320 (as described above) is performed to use NLP to identify any ingredient(s) in the list of ingredients that do not comply with the user's dietary restrictions. In one embodiment, at least one performance of step 320 identifies at least one non-compliant ingredient in a list of ingredients for a given menu item.

Step 324 is performed (i) after the Yes branch of step 318 and step 320 and (ii) after the No branch of step 318, step 322, and step 320. In step 324, text extraction module 204 determines whether there is another menu item in the extracted text that has not yet been processed in the loop that began at step 316. If text extraction module 204 determines in step 324 that there is another menu item, then the Yes branch of step 324 is followed and the loop is repeated starting at step 316.

If text extraction module 204 determines in step 324 that there is not another menu item, then the No branch of step 324 is followed and step 326 is performed.

In step 326, menu generation module 210 receives a selection from the device of the user to generate and display a digital menu that is either a full menu or a menu customized to the user's dietary restrictions. A full menu includes all of the menu items included in the menu of the restaurant, regardless of whether a given menu item is compliant or non-compliant. A digital menu customized to the user's dietary restrictions includes all of the one or more menu items in the restaurant menu that are compliant and does not include any menu item in the restaurant menu that is non-compliant.

If menu generation module 210 receives in step 326 a selection to generate and display the customized digital menu, then the Customized branch of step 326 is followed and step 328 is performed.

In step 328, menu generation module 210 generates the customized digital menu that includes all of the menu item(s) in the restaurant menu whose ingredient(s) comply with the user's dietary restrictions, but does not include any of the other menu item(s) in the restaurant menu for which any ingredient is not compliant with the user's dietary restrictions. After the generation of the digital menu in step 328, display module 212 displays the generated customized digital menu for viewing by the user (e.g., displays the digital menu on the user's device via the app).

In one embodiment, menu generation module 210 uses JAVASCRIPT® and JQUERY® to modify the online menu loaded in step 308 to remove the non-compliant menu items and show only the compliant menu items. JAVASCRIPT is a registered trademark of Oracle America, Inc. located in Redwood Shores, California. JQUERY is a registered trademark of OpenJS Foundation located in San Francisco, California.

Returning to step 326, if menu generation module 210 receives a selection to display the full digital menu, then the Full branch of step 326 is followed and step 330 is performed.

In step 330, menu generation module 210 generates the full digital menu that includes both the menu item(s) in the restaurant menu whose ingredients comply with the user's dietary restrictions and the other menu item(s) in the restaurant menu for which any ingredient is not compliant with the user's dietary restrictions. Menu generation module 210 generates the digital menu so that the menu includes visual indicators (e.g., boldface text, circled text, icons, or text presented in a different color) that indicate menu item(s) and/or ingredient(s) that do not comply with the user's dietary restrictions. After the generation of the digital menu in step 330, display module 212 displays the generated full digital menu for viewing by the user (e.g., displays the digital menu on the user's device via the app).

Although not shown in FIG. 3B, the app can receive selections from the user to toggle back and forth between displaying, on a device operated by the user, the customized digital menu and displaying on the device the full digital menu (i.e., toggle between displaying the menu generated by step 328 and displaying the menu generated by step 330). For example, the app is currently displaying, on a display of a device operated by the user, an initial version of the digital menu (i.e., either the version that is the customized digital menu or another version that is the full digital menu), and then receives, from the device, a user's selection of a subsequent version of the digital menu (i.e., the version of the digital menu that is not currently displayed). In response to receiving the selection, display module 212 removes the currently displayed version from the display of the device, and displays, on the display of the device, the version of the digital menu corresponding to the selection.

Step 332 follows step 328 and step 330. In step 332, the app receives an order of menu item(s), where the order is entered by the user based on a viewing of the digital menu generated and displayed in step 328 or step 330. Following step 332, the process of FIGS. 3A-3B ends at an end node 334.

In one embodiment, certain steps in the process of FIGS. 3A-3B cause an occurrence of respective trigger events. Alert module 214 detects the occurrence of a given trigger event and in response to the detection, generates and displays an alert on the device that is executing the app and is being operated by the user. In one embodiment, the full menu displayed by step 330 includes selectable icon(s) in proximity to respective non-compliant menu item(s), where the selectable icon(s) are generated in response to respective occurrence(s) of trigger event(s). In response to receiving a selection of a given selectable icon via the device executing the app, the app generates and displays an alert associated with the selected icon, where the alert is an explanatory message providing a reason why the menu item is flagged by the given icon and possible action(s) the user could take if the user wants to order that menu item.

Examples of trigger events and their associated alerts are described below. In the examples shown below, the app replaces "[menu item]" with the name of the menu item and "[restricted ingredient]" with the name of the ingredient that is associated with an actual trigger event. If multiple ingredients are detected in the occurrence of an actual trigger event, then the app replaces "[restricted ingredient]" with a list of the multiple ingredients. As used herein, a restricted ingredient is a non-compliant ingredient.

Trigger event 1: Menu item contains ingredients from a restricted list of ingredients, as determined by step 320.

Alert for trigger event 1: "[Menu item] description contains [restricted ingredient]. Ask if [menu item] can be made without [restricted ingredient] or if [restricted ingredient] can be replaced with something else."

Trigger event 2: Recipes for similar menu items in the recipe database contain ingredients from the restricted list of ingredients, as determined by step 322.

Alert for trigger event 2: "Other [menu item] recipes contain [restricted ingredient]. Ask wait staff to check with the chef to confirm the actual ingredients."

Trigger event 3: Menu item description has few to no discernable ingredients mentioned, as determined by the No branch of step 318.

Alert for trigger event 3: "[Menu item] description contains insufficient ingredient information to make a full evaluation. Ask wait staff to clarify ingredients."

Trigger event 4: Menu item name and/or ingredients do not match any other recipe or ingredients in the recipe database, as determined by step 318.

Alert for trigger event 4: "Insufficient data to make evaluation of [menu item]."

Trigger event 5: Text could not be extracted from image due to poor image quality, low light conditions, font style, font size, or low color contrast level between font color and background color, as determined by step 312.

Alert for trigger event 5: "[Menu item] text could not be processed due to poor image quality. Try re-capturing the image of the menu."

Trigger event 6: Website connected to QR code is not reachable due to poor wireless local area network (WLAN) poor cellular connectivity, or due to a website error such as a "404 error" indicating a web server cannot find the webpage associated with the QR code, as determined by a step (not shown) of attempting to scan the QR code, which follows the Yes branch of step 306 and precedes step 308.

Alert for trigger event 6: "Unable to connect to online menu."

In one embodiment, the app displays an alert to the user to remind the user to not rely exclusively on the digital menu provided by the app, but to also check with wait staff to confirm that a particular menu item complies with the user's dietary restrictions.

In one embodiment, the app identifies icons or other graphical indicators in the menu in either step 310 or step 314. The icons or other graphical indicators indicate that particular menu items comply with corresponding dietary restrictions. Using the identified icons or other graphical indicators, the app performs a modification of step 320, so that compliance module 208 does not analyze the aforementioned menu items with respect to the aforementioned corresponding dietary restrictions, but still analyzes the menu items with respect to any other dietary restrictions that are not associated with the identified icons or other graphical indicators.

In one embodiment, the app generates the full menu in step 330 so that risk ratings accompany respective non-compliant ingredients in menu items in the full menu, where the risk rating is based on a combination of the following factors: ease of removal, potential for physical harm, and prevalence of the ingredient in other recipes similar to the menu item. These factors are described in more detail below.

One distinction with respect to ingredients is whether the restricted ingredient is easily removed or replaced (e.g., cheese on a hamburger or ham in a salad), or whether the ingredient is integrated into the menu item during the preparation of the menu item (e.g., wheat flour in a bun or sauce). The app uses this distinction to assign an "ease of removal" score to each restricted ingredient. The app assigns higher ease of removal scores to ingredients that are integrated into the menu item during preparation, while assigning lower ease of removal scores to ingredients that are optional or simply added to a primary menu item. For example, the app assigns an ease of removal score of 0 if no restricted ingredient is found, 3 if the ingredient is optional or removable, and 10 if the ingredient is integrated into the menu item during preparation.

Another distinction with respect to ingredients is whether the eating of the restricted ingredient causes physical harm and if it does cause physical harm, what is the severity of the physical harm. The app uses this distinction to assign a "potential for physical harm" score to each restricted ingredient. Regarding the assignment of potential for physical harm scores, the app assigns a highest score to ingredients that can cause a medical emergency if eaten, a medium to high score to ingredients that cause severe physical distress, and a lower score to ingredients that sometime cause mild distress. For example, the app may assign a potential for physical harm score of 10 for a restricted ingredient that causes a medical emergency, a 7 to an ingredient such as wheat for a user who has celiac disease, and a 4 to an ingredient such as dairy for a user who is lactose intolerant but occasionally eats dairy.

Yet another distinction with respect to ingredients is how often given ingredients in menu items are found in recipes for similar menu items. The app uses this distinction to assign a "prevalence of ingredient in other recipes" score to each restricted ingredient. The app assigns a prevalence of ingredient in other recipes score based on the percentage of recipes found that contain the restricted ingredient (i.e., multiply the percentage by 10 and round to the nearest integer to determine the score). For example, if 80% of the recipes found contain the restricted ingredient, then the app assigns an 8 as the prevalence of ingredient in other recipes score, and if 33% of the recipes found contain the restricted ingredient, then the app assigns a 3 as the score. Regardless of the score, if any of the recipes include a restricted ingredient, the app informs the user about the findings.

In one embodiment, the app calculates a risk rating score for a restricted ingredient by the following equation:

Risk rating=ease of removal score+potential for physical harm score+prevalence of ingredient in other recipes score For example, the app calculates the a risk rating of 10 for cheese on a hamburger for a user who is lactose intolerant, as shown below.

Risk rating=3 (easy to remove)+4 (mild gastrointestinal distress)+3 (in 33% of the recipes found)=10.

As another example, the app calculates a risk rating of 27 for an omelet for a user who is allergic to eggs, as shown below.

Risk rating=10 (hard to remove)+7 (may cause hives)+10 (in all recipes found)=27.

Figure 4:
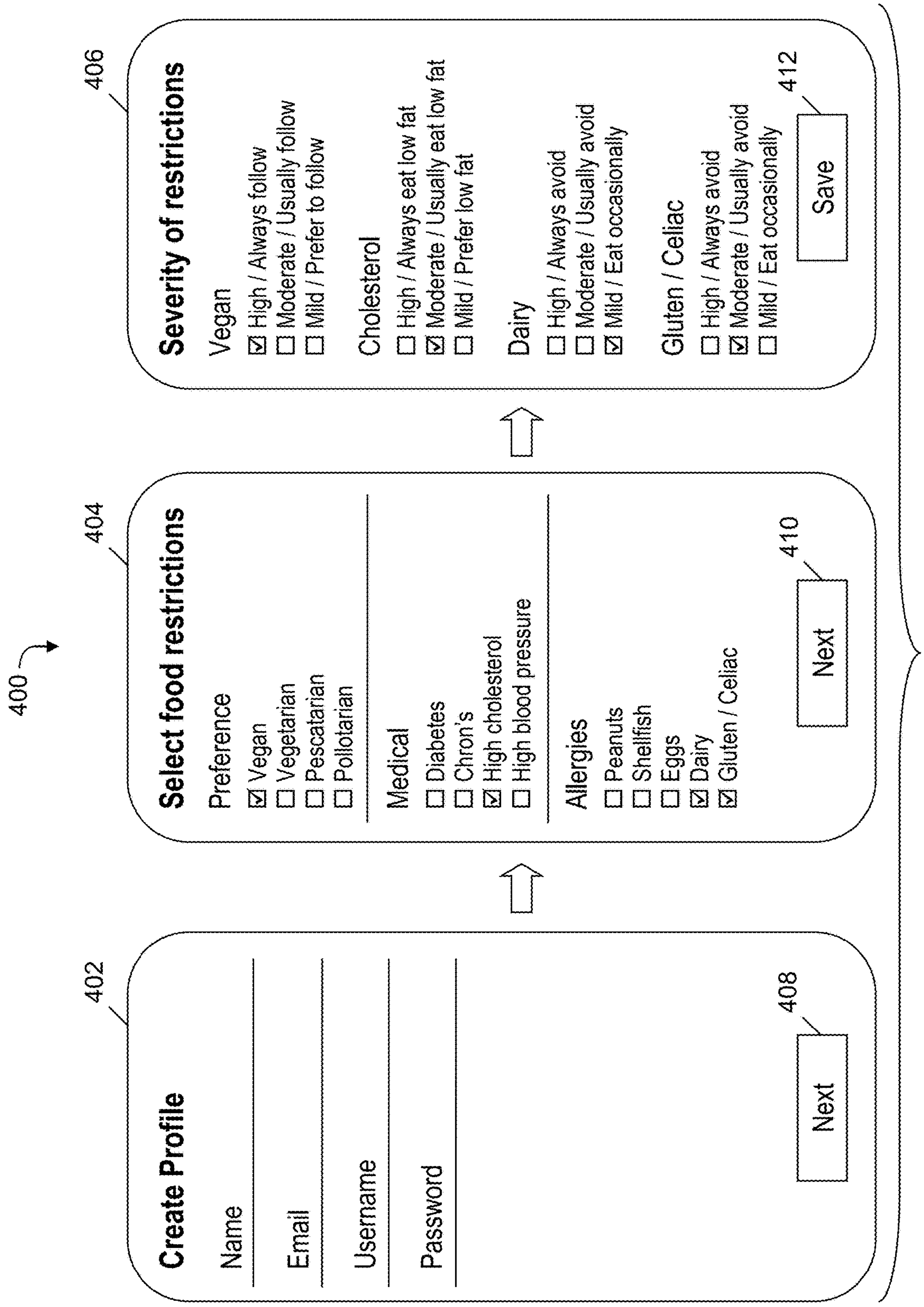
FIG. 4 is an example of creating a profile and receiving information in the profile about dietary restrictions of a user within the process of FIGS. 3A-3B, in accordance with embodiments of the present invention.

FIG. 4 is an example 400 of creating a profile and receiving information in the profile about dietary restrictions of a user within the process of FIGS. 3A-3B, in accordance with embodiments of the present invention. Example 400 includes a first entry page 402 for creating a profile for a user via the app. First entry page 402 includes entry fields for a name of the user, an email address of the user, and a username and password for using the app. Example 400 also includes a second entry page 404, which includes checkbox entries for the user to select food restrictions, where the food restrictions are organized into categories labeled Preference, Medical, and Allergies. For example, second entry page 404 includes checks in checkboxes indicating that a user has selected the food restrictions of Vegan, High cholesterol, Dairy, and Gluten/Celiac. Example 400 further includes a third entry page 406, which includes checkbox entries for the user to select a rating (i.e., High, Moderate, or Mild) of the severity of the food restrictions that were selected on second entry page 404. A checked entry in third entry page 406 for a given dietary restriction indicates the user's preference for a level of risk (i.e., mild, moderate, or high) the user is willing to take with regard to eating ingredients that do not comply with the given dietary restriction. For example, third entry page 406 includes checks in checkboxes indicating that the user made selections to designate that the severity of the: (1) Vegan food restriction is High (i.e., the user always follows the Vegan food restriction); (2) Cholesterol restriction is Moderate (i.e., the user usually eats low fat foods); (3) Dairy restriction is Mild (i.e., the user eats dairy foods occasionally); and (4) Gluten/Celiac restriction is Moderate (i.e., the user usually avoids gluten).

First entry page 402, second entry page 404, and third entry page 406 are displayed on the device of the user via the app. First entry page 402 includes a Next button 408. In response to the user selecting Next button 408, the device displays the next entry page, which is second entry page 404. Second entry page 404 includes a Next button 410. In response to the user selecting Next button 410, the device displays the next entry page, which is third entry page 406. Third entry page 406 includes a Save button 412. In response to the user selecting Save button 412, the app saves the entries made on first, second, and third entry pages 402, 404, and 406 in a profile.

Figure 5:
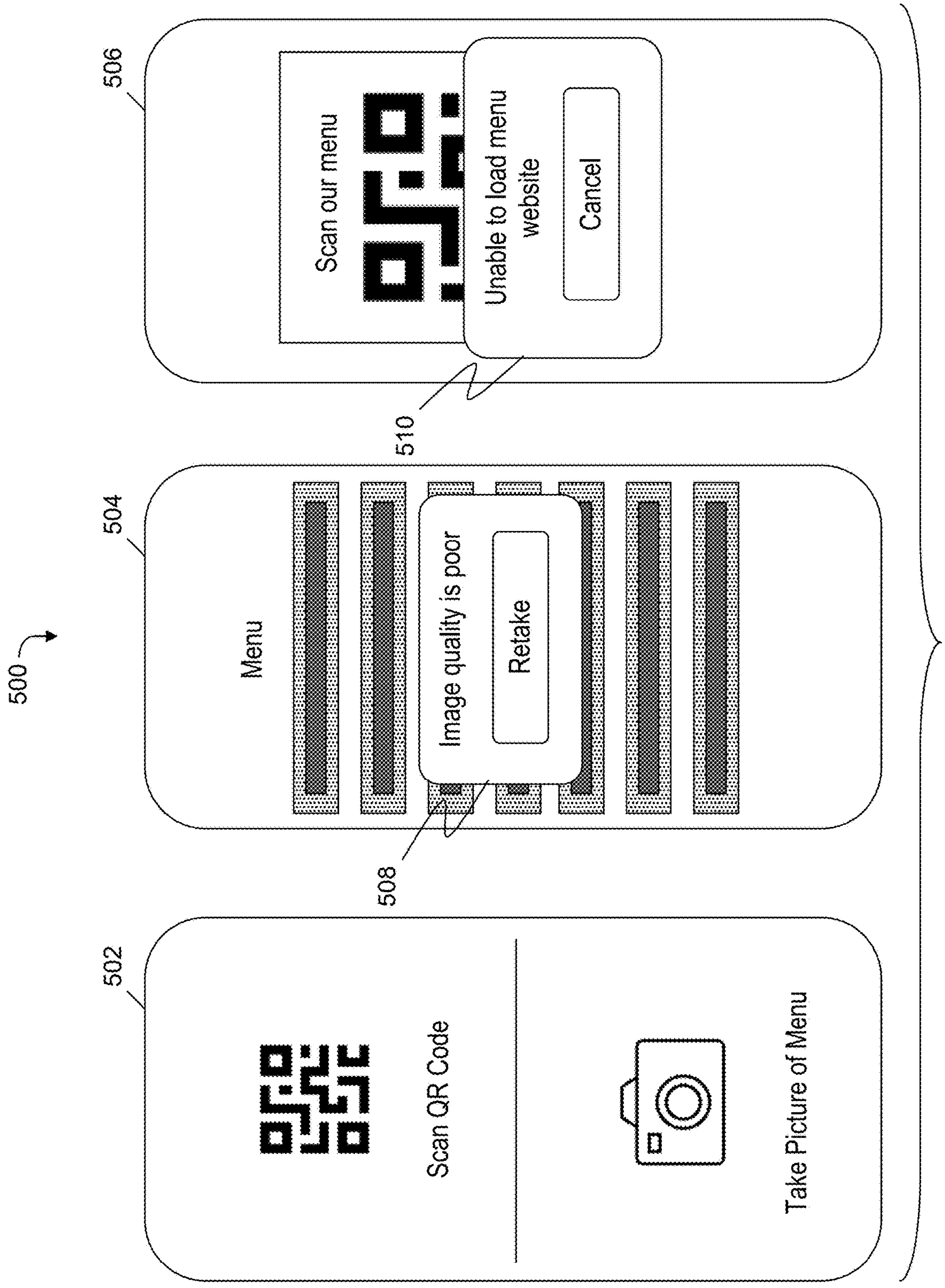
FIG. 5 is an example of alerts generated in response to trigger events associated with scanning a quick-response (QR) code and capturing an image of a physical menu, in accordance with embodiments of the present invention.

FIG. 5 is an example 500 of alerts generated in response to trigger events associated with scanning a QR code and capturing an image of a physical menu, in accordance with embodiments of the present invention. Example 500 includes a page 502 that includes a first selection labeled "Scan QR Code" to scan a QR code of a restaurant menu in step 308 and a second selection labeled "Take Picture of Menu" to capture an image of a physical restaurant menu in step 312.

Example 500 also includes an image 504 of a physical restaurant menu, which was captured using the "Take Picture of Menu" selection on page 502. In response to capturing image 504 in step 312, alert module 214 determines that a trigger event occurs, whereby text in the captured image could not be extracted from the image due to poor image quality. Alert module 214 generates and displays alert 508 that indicates that the image quality is poor and provides a selection button to allow the user to retake the image of the physical restaurant menu.

Example 500 also includes an image 506 of a restaurant-provided printed display that includes the QR code that is linked to the restaurant menu. Image 506 was scanned using the "Scan QR Code" selection in page 502. In response to scanning the QR code shown in image 506 in a step (not shown) that follows the Yes branch of step 306 and precedes step 308, alert module 214 determines that a trigger event occurs, whereby the website associated with the QR code is not reachable due to poor WLAN or cellular connectivity or due to a website error such as a 404 error indicating that a web server cannot find the webpage associated with the QR code. Alert module generates and displays alert 510 that indicates that the app was unable to load the menu website. Alert 510 includes a selection button that allows the user to cancel the scanning of the QR code.

Figure 6:
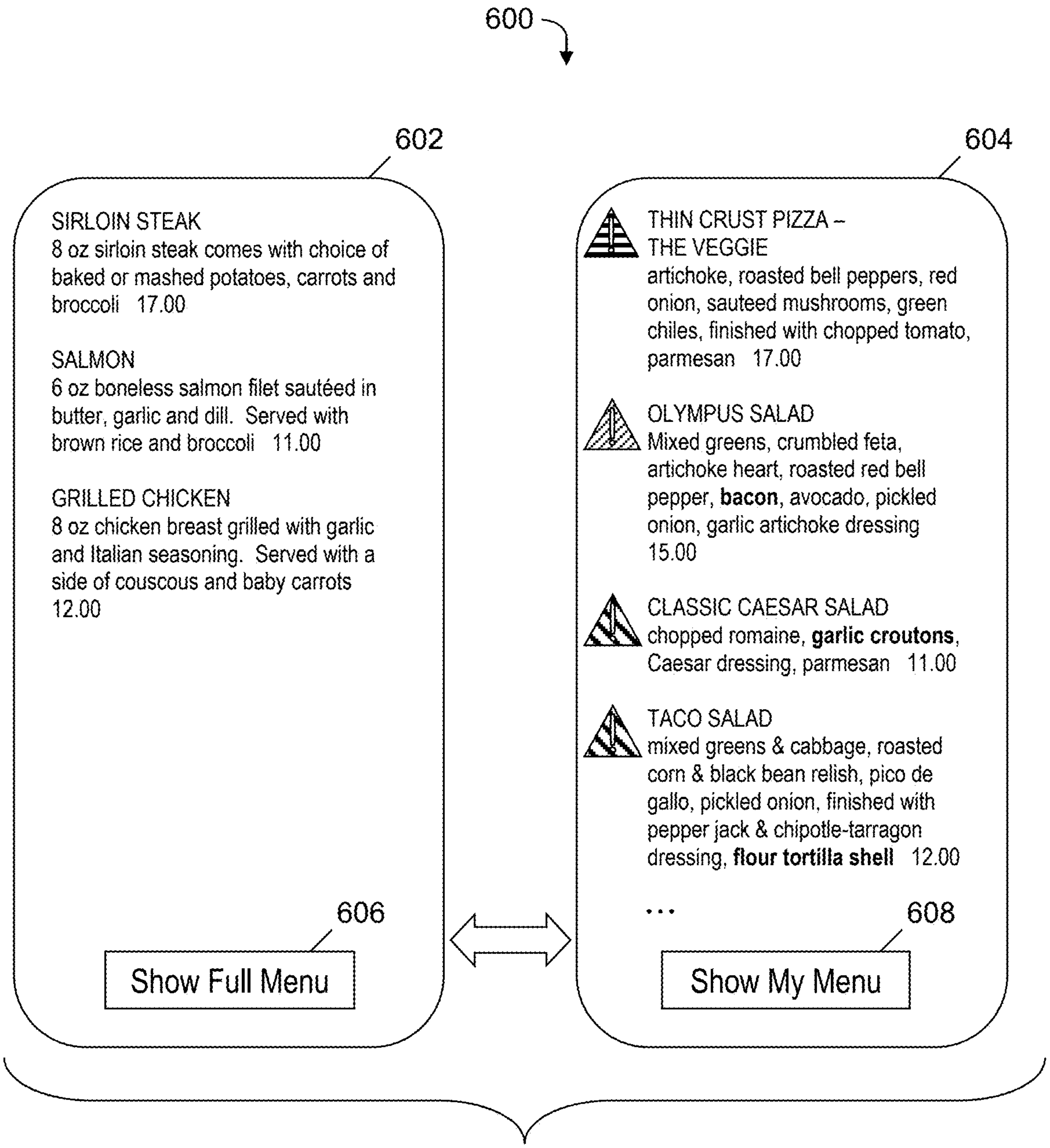
FIG. 6 is an example that includes a menu that shows the customized menu and another menu that shows the full menu within the process of FIGS. 3A-3B, in accordance with embodiments of the present invention.

FIG. 6 is an example 600 that includes a menu that shows the customized menu and another menu that shows the full menu within the process of FIGS. 3A-3B, in accordance with embodiments of the present invention.

Example 600 includes a customized menu 602 generated by step 328 and a full menu 604 generated by step 330. In example 600, the user's dietary restrictions are the restrictions selected in second entry page 404 in FIG. 4. Customized menu 602 includes only those menu items whose ingredients comply with the user's dietary restrictions. Full menu 604 includes menu items (i.e., thin crust pizza, Olympus salad, classic Caesar salad, and taco salad), whose ingredients are non-compliant or where the name of the menu item indicates a possibility that the menu item includes one or more non-compliant ingredients. Although not shown FIG. 6, the display that includes full menu 604 includes a scroll bar or other user interface feature that allows the user to scroll or otherwise display other menu items in the full menu, including the compliant menu items shown in customized menu 602. The triangle icon next to the thin crust pizza menu item is a first color (e.g., red) to indicate that the ingredients or possible ingredients in the menu item are associated with a dietary restriction that the user has designated in the profile as having a high severity rating. The triangle icons next to the classic Caesar salad and the taco salad menu items are a second color (e.g., orange) to indicate that the ingredients in the menu items are associated with a dietary restriction that the user has designated in the profile as having a moderate severity rating. The triangle icon next to the Olympus salad menu item is a third color (e.g., yellow) to indicate that the ingredients in the menu item is associated with a dietary restriction that the user has designated in the profile as having a mild severity rating. The boldface type for "bacon" in the ingredients of the Olympus salad, "garlic croutons" in the ingredients of the classic Caesar salad, and "flour tortilla shell" in the ingredients of the taco salad are visual indicators generated and displayed in step 330 that indicate that the ingredients in boldface are non-compliant. For example, the flour tortilla shell is in boldface to indicate the ingredient is non-compliant because the user designated gluten/celiac as a dietary restriction in the user's profile.

Customized menu 602 includes a selection button 606 labeled "Show Full Menu," which when activated by the user causes the app to switch the display on the user's device from showing customized menu 602 to showing full menu 604.

Full menu 604 includes a selection button 608 labeled "Show My Menu," which when activated by the user causes the app to switch the display on the user's device from showing full menu 604 to showing customized menu 602.

Repeated activation of button 606 and button 608 in sequence toggles the display on the user's device back and forth between full menu 604 (in response to activating button 606) and customized menu 602 (in response to activating button 608).

Figure 7:
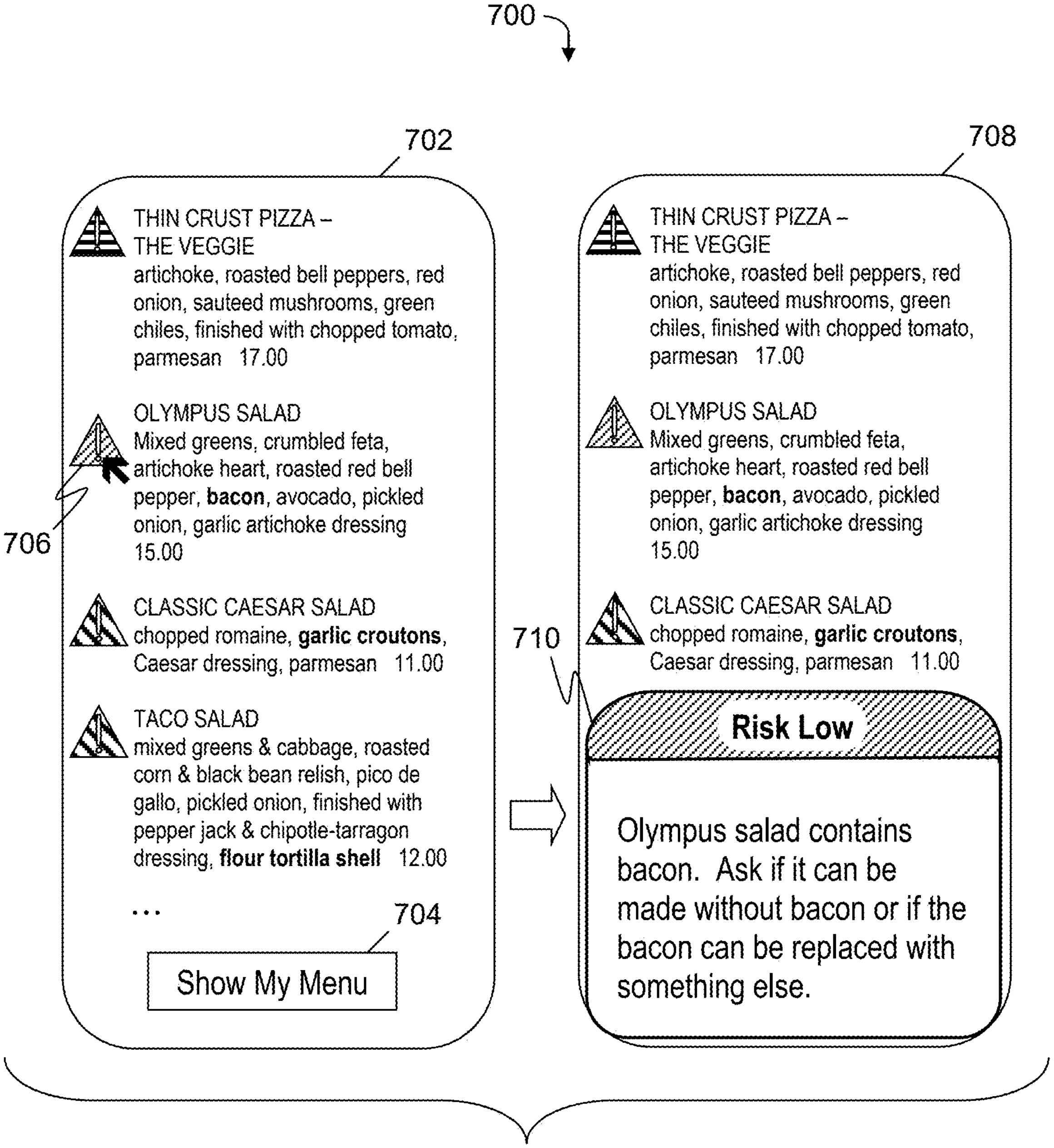
FIG. 7 is an example of a full menu that includes alert icons and an alert generated in response to selecting an alert icon specifying a low risk menu item, in accordance with embodiments of the present invention.

FIG. 7 is an example 700 of a full menu 702 that includes alert icons and an alert generated in response to selecting an alert icon specifying a low risk menu item, in accordance with embodiments of the present invention. Example 700 includes a full menu 702, which shows the same menu items as full menu 604. Full menu 702 includes a selection button 704, which has the same functionality as selection button 608. The arrow at the icon next to Olympus salad in full menu 702 indicates that the user selects icon 706 via the app. In response to the selection of icon 706, a display 708 is shown on the device operated by the user, where the display 708 includes an alert 710 labeled "Risk Low" that overlays a portion of full menu 702. Alert 710 also includes an explanatory message that provides reason(s) why the menu item was flagged with the icon and possible action(s) that the user can take if the user wants to order the Olympus salad menu item.

Figure 8:
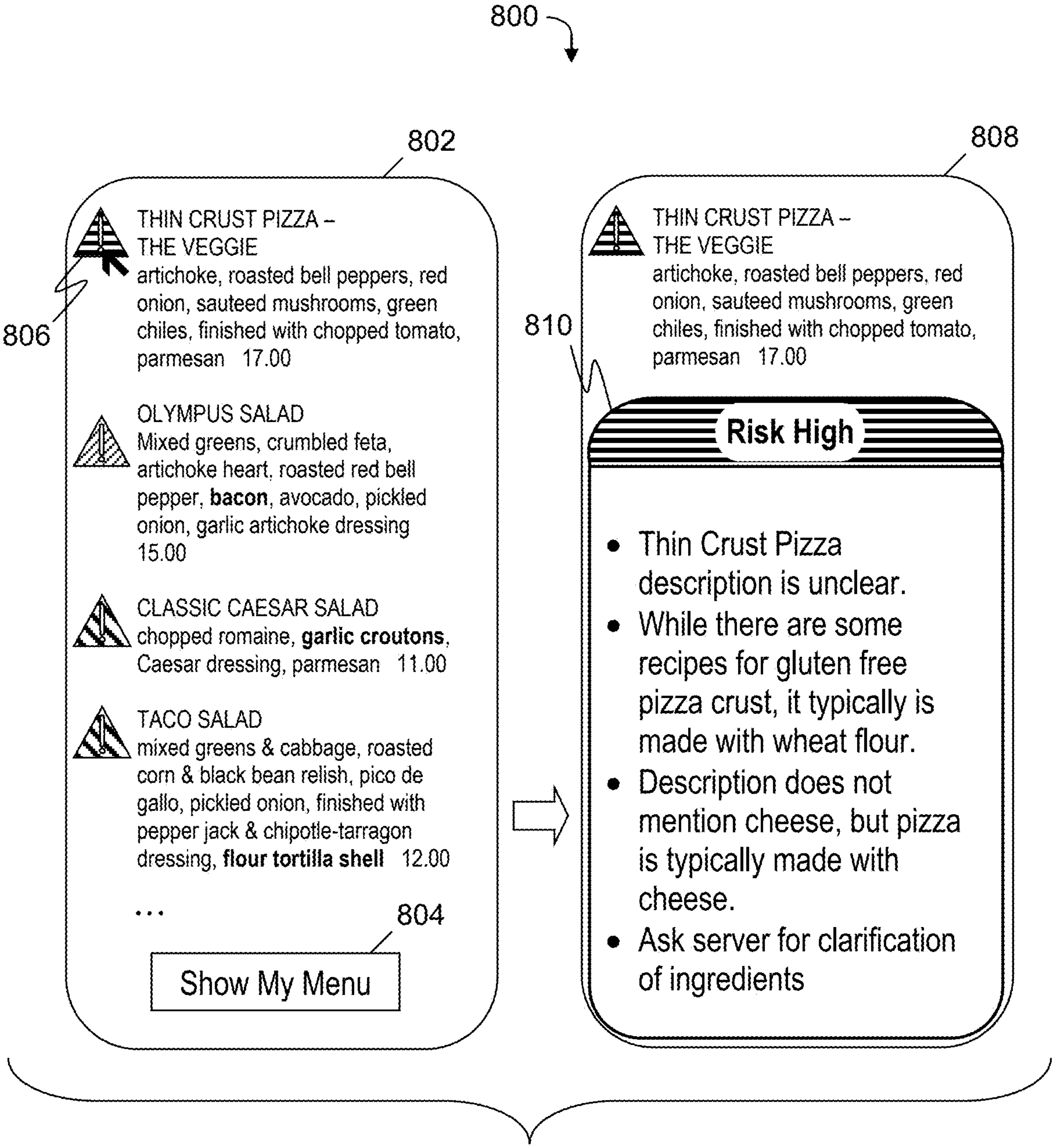
FIG. 8 is an example of a full menu that includes alert icons and an alert generated in response to selecting an alert icon specifying a high risk menu item, in accordance with embodiments of the present invention.

FIG. 8 is an example 800 of a full menu that includes alert icons and an alert generated in response to selecting an alert icon specifying a high risk menu item, in accordance with embodiments of the present invention. Example 800 includes a full menu 802, which shows the same menu items as full menu 604 in FIG. 6. Full menu 802 includes a selection button 804, which has the same functionality as selection button 608 in FIG. 6. The arrow at the icon next to thin crust pizza in full menu 802 indicates that the user selects icon 806 via the app. In response to the selection of icon 806, a display 808 is shown on the device operated by the user, where the display 808 includes an alert 810 labeled "Risk High" that overlays a portion of full menu 802. Alert 810 also includes an explanatory message that provides reason(s) why the menu item was flagged with the icon and possible action(s) that the user can take if the user wants to order the thin crust pizza menu item.

Figure 9:
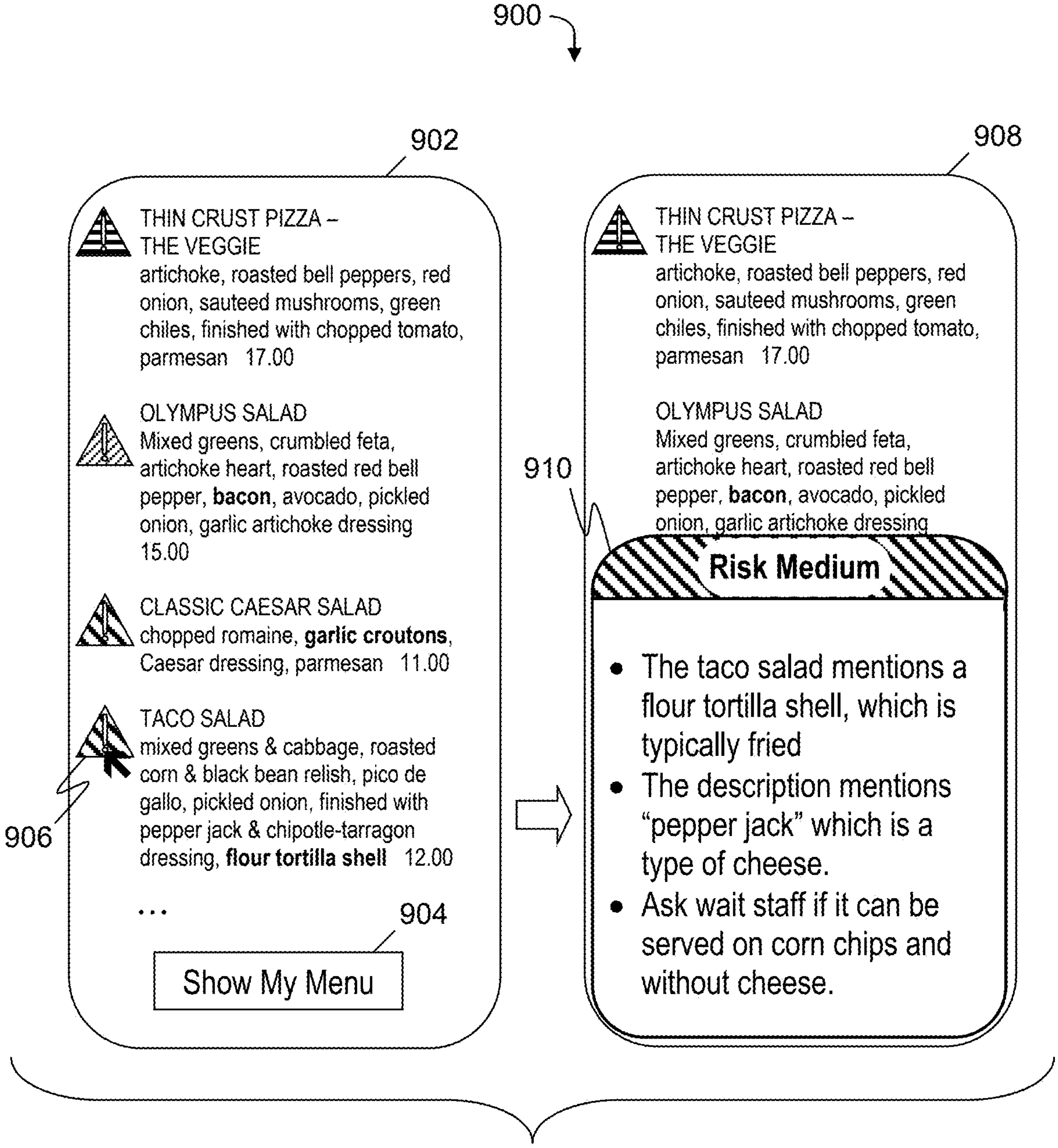
FIG. 9 is an example of a full menu that includes alert icons and an alert generated in response to selecting an alert icon specifying a medium risk menu item, in accordance with embodiments of the present invention.

FIG. 9 is an example 900 of a full menu 902 that includes alert icons and an alert generated in response to selecting an alert icon specifying a medium risk menu item, in accordance with embodiments of the present invention. Example 900 includes a full menu 902, which shows the same menu items as full menu 604 in FIG. 6. Full menu 902 includes a selection button 904, which has the same functionality as selection button 608 in FIG. 6. The arrow at the icon next to taco salad in full menu 902 indicates that the user selects icon 906 via the app. In response to the selection of icon 906, a display 908 is shown on the device operated by the user, where the display 908 includes an alert 910 labeled "Risk Medium" that overlays a portion of full menu 902. Alert 910 also includes an explanatory message that provides reason(s) why the menu item was flagged with the icon and possible action(s) that the user can take if the user wants to order the taco salad menu item.

What is claimed is:

1. A computer-implemented method, comprising:

receiving information about dietary restrictions of a user via a profile in a software application;

capturing, via an imagery sensor of a device operated by the user, an image of a quick-response (QR) code linked to an online menu, wherein the device is executing the software application;

loading, based on a hyperlink within the QR code, a webpage including the online menu;

extracting, by a processor set, a text from a digital version of a menu of a restaurant, wherein the menu of the restaurant is the online menu;

determining, using natural language processing (NLP), that the extracted text does not include a list of ingredients for a first menu item included in the menu of the restaurant;

executing, based on the determining that the extracted text does not include the list of ingredients for the first menu item, an online search query to search for recipes corresponding to the first menu item;

identifying, based on the executing of the online search query, the recipes corresponding to the first menu item;

identifying, based on the identifying of the recipes corresponding to the first menu item, the list of ingredients of the first menu item;

determining, by the processor set and using the NLP, that the identified list of ingredients of the first menu item includes at least one ingredient that does not comply with the dietary restrictions of the user;

identifying one or more ingredients of a second menu item within the extracted text, the second menu item being included in the menu of the restaurant;

determining, by the processor set and using the NLP, that the identified one or more ingredients of the second menu item comply with the dietary restrictions of the user;

based on the at least one ingredient included in the identified list of ingredients of the first menu item not complying with the dietary restrictions and the one or more ingredients of the second menu item complying with the dietary restrictions, generating, by the processor set, a first digital menu that includes the second menu item, but does not include the first menu item, wherein the generating of the first digital menu comprises modifying the loaded online menu of the webpage to:

remove the first menu item not complying with the dietary restrictions, and display the second menu item complying with the dietary restrictions; and controlling display of the first digital menu to the user for ordering one or more menu items included in the first digital menu, wherein the one or more menu items comprise the second menu item.

2. The computer-implemented method of claim 1, further comprising:

generating, based on the determining that the extracted text does not include the list of ingredients for the first menu item, the online search query by the software application to search for the recipes corresponding to the first menu item.

3. The computer-implemented method of claim 1, further comprising:

determining that the extracted text does not include a list of ingredients for a third menu item included in the menu of the restaurant;

based on the determining that the extracted text does not include the list of ingredients for the third menu item, identifying one or more recipes corresponding to the third menu item by generating and executing an online search query by the software application to search for the one or more recipes corresponding to the third menu item;

based on the identified one or more recipes corresponding to the third menu item, determining a complete list of ingredients of the third menu item; and determining, by the processor set and using the NLP, that the complete list of ingredients of the third menu item complies with the dietary restrictions of the user, wherein the generating of the first digital menu includes generating the first digital menu that includes the third menu item.

4. The computer-implemented method of claim 1, further comprising:

receiving, from the device operated by the user and executing the software application, an initial selection, wherein the initial selection selects an initial version of the first digital menu selected from the group consisting of a first version of the first digital menu and a second version of the first digital menu, the first version hides non-compliant menu items, and the second version shows the non-compliant menu items;

based on the receiving of the initial selection, displaying the selected initial version of the first digital menu to the user on a display of the device;

receiving, from the device operated by the user and executing the software application, a subsequent selection, wherein the subsequent selection selects a subsequent version of the first digital menu selected from the group consisting of the first version of the first digital menu and the second version of the first digital menu, and the initial selection is different from the subsequent selection; and based on the receiving of the subsequent selection, removing the initial version of the first digital menu from the display of the device and displaying the subsequent version of the first digital menu on the display of the device for viewing by the user.

5. The computer-implemented method of claim 1, further comprising:

determining an occurrence of a triggering event associated with the first menu item;

based on the determining of the occurrence of the triggering event, generating an alert;

generating, by the processor set, a second digital menu that includes the first menu item, the second menu item, and an icon associated with the first menu item and the alert;

displaying the second digital menu on a display of the device operated by the user, wherein the second digital menu includes the first menu item in a proximity with the icon, and the second digital menu does not include the alert;

receiving a selection of the icon from the device operated by the user; and based on the receiving of the selection, displaying the alert on the display of the device operated by the user.

6. The computer-implemented method of claim 1, further comprising calculating a risk rating for the first menu item, by assigning an ease of removal score to the at least one ingredient of the first menu item and a potential for physical harm score to the at least one ingredient of the first menu item.

7. The computer-implemented method of claim 6, further comprising controlling, based on a user operation, display of a second digital menu that includes the first menu item, the second menu item, and the risk rating of the first menu item.

8. A computer system, comprising:

a processor set;

a set of one or more computer-readable storage media; and program instructions, collectively stored in the set of one or more computer-readable storage media, for causing the processor set to:

receive information about dietary restrictions of a user via a profile in a software application;

capture, via an imagery sensor of a device operated by the user, an image of a quick-response (QR) code linked to an online menu, wherein the device executes the software application;

load, based on a hyperlink within the QR code, a webpage including the online menu;

extract a text from a digital version of a menu of a restaurant, wherein the menu of the restaurant is the online menu;

determine, using natural language processing (NLP), that the extracted text does not include a list of ingredients for a first menu item included in the menu of the restaurant;

execute, based on the determination that the extracted text does not include the list of ingredients for the first menu item, an online search query to search for recipes corresponding to the first menu item;

identify, based on the execution of the online search query, the recipes corresponding to the first menu item;

identify, based on the identification of the recipes corresponding to the first menu item, the list of ingredients of the first menu item;

determine, using the NLP, that the identified list of ingredients of the first menu item includes at least one ingredient that does not comply with the dietary restrictions of the user;

identify one or more ingredients of a second menu item within the extracted text, the second menu item being included in the menu of the restaurant;

determine, using the NLP, that the identified one or more ingredients of the second menu item comply with the dietary restrictions of the user;

based on the at least one ingredient included in the identified list of ingredients of the first menu item not complying with the dietary restrictions and the one or more ingredients of the second menu item complying with the dietary restrictions, generate a first digital menu that includes the second menu item, but does not include the first menu item, wherein the generation of the first digital menu comprises modification of the loaded online menu of the webpage to:

remove the first menu item not complying with the dietary restrictions, and display the second menu item complying with the dietary restrictions; and control display of the first digital menu to the user to order one or more menu items included in the first digital menu, wherein the one or more menu items comprise the second menu item.

9. The computer system of claim 8, wherein the program instructions further cause the processor set to:

generate, based on the determination that the extracted text does not include the list of ingredients for the first menu item, the online search query by the software application to search for the recipes corresponding to the first menu item.

10. The computer system of claim 8, wherein the program instructions further cause the processor set to:

determine that the extracted text does not include a list of ingredients for a third menu item included in the menu of the restaurant;

based on the determination that the extracted text does not include the list of ingredients for the third menu item, identify one or more recipes corresponding to the third menu item by generating and executing an online search query by the software application to search for the one or more recipes corresponding to the third menu item;

based on the identified one or more recipes corresponding to the third menu item, determine a complete list of ingredients of the third menu item; and determine, using the NLP, that the complete list of ingredients of the third menu item complies with the dietary restrictions of the user, wherein the generation of the first digital menu includes generation of the first digital menu that includes the third menu item.

11. The computer system of claim 8, wherein the program instructions further cause the processor set to:

receive, from the device operated by the user and executing the software application, an initial selection, wherein the initial selection selects an initial version of the first digital menu selected from the group consisting of a first version of the first digital menu and a second version of the first digital menu, the first version hides non-compliant menu items, and the second version shows the non-compliant menu items;

based on the reception of the initial selection, control display of the selected initial version of the first digital menu to the user on a display of the device;

receive, from the device operated by the user and executing the software application, a subsequent selection, wherein the subsequent selection selects a subsequent version of the first digital menu selected from the group consisting of the first version of the first digital menu and the second version of the first digital menu, and the initial selection is different from the subsequent selection; and based on the reception of the subsequent selection, remove the initial version of the first digital menu from the display of the device and control display of the subsequent version of the first digital menu on the display of the device for viewing by the user.

12. The computer system of claim 8, wherein the program instructions further cause the processor set to:

determine an occurrence of a triggering event associated with the first menu item;

based on the determination of the occurrence of the triggering event, generate an alert;

generate a second digital menu that includes the first menu item, the second menu item, and an icon associated with the first menu item and the alert;

control display of the second digital menu on a display of the device operated by the user, wherein the second digital menu includes the first menu item in a proximity with the icon, and the second digital menu does not include the alert;

receive a selection of the icon from the device operated by the user; and based on the reception of the selection, control display of the alert on the display of the device operated by the user.

13. A computer program product, comprising:

a set of one or more computer-readable storage media; and program instructions, collectively stored in the set of one or more computer-readable storage media, for causing a processor set to:

receive information about dietary restrictions of a user via a profile in a software application;

capture, via an imagery sensor of a device operated by the user, an image of a quick-response (QR) code linked to an online menu, wherein the device executes the software application;

load, based on a hyperlink within the QR code, a webpage including the online menu;

extract a text from a digital version of a menu of a restaurant, wherein the menu of the restaurant is the online menu;

determine, using natural language processing (NLP), that the extracted text does not include a list of ingredients for a first menu item included in the menu of the restaurant;

execute, based on the determination that the extracted text does not include the list of ingredients for the first menu item, an online search query to search for recipes corresponding to the first menu item;

identify, based on the execution of the online search query, the recipes corresponding to the first menu item;

identify, based on the identification of the recipes corresponding to the first menu item, the list of ingredients of the first menu item;

determine, using the NLP, that the identified list of ingredients of the first menu item includes at least one ingredient that does not comply with the dietary restrictions of the user;

identify one or more ingredients of a second menu item within the extracted text, the second menu item being included in the menu of the restaurant;

determine, using the NLP, that the identified one or more ingredients of the second menu item comply with the dietary restrictions of the user;

based on the at least one ingredient included in the identified list of ingredients of the first menu item not complying with the dietary restrictions and the ingredients of the second menu item complying with the dietary restrictions, generate a digital menu that includes the second menu item, but does not include the first menu item, wherein the generation of the digital menu comprises modification of the loaded online menu of the webpage to:

remove the first menu item not complying with the dietary restrictions, and display of the second menu item complying with the dietary restrictions; and control display of the digital menu to the user to order one or more menu items included in the digital menu wherein the one or more menu items comprise the second menu item.

14. The computer program product of claim 13, wherein the program instructions further cause the processor set to:

generate, based on the determination that the extracted text does not include the list of ingredients, the online search query by the software application to search for the recipes corresponding to the first menu item.

15. The computer program product of claim 13, wherein the program instructions further cause the processor set to:

determine that the extracted text does not include a list of ingredients for a third menu item included in the menu of the restaurant;

based on the determination that the extracted text does not include the list of ingredients for the third menu item, identify one or more recipes corresponding to the third menu item by generating and executing an online search query by the software application to search for the one or more recipes corresponding to the third menu item;

based on the identified one or more recipes corresponding to the third menu item, determine a complete list of ingredients of the third menu item; and determine, using the NLP, that the ingredients in the complete list of ingredients of the third menu item complies with the dietary restrictions of the user, wherein the generation of the digital menu includes generation of the digital menu that includes the third menu item.

16. The computer program product of claim 13, wherein the program instructions further cause the processor set to:

receive, from the device operated by the user and executing the software application, an initial selection, wherein the initial selection selects an initial version of the digital menu selected from the group consisting of a first version of the digital menu and a second version of the digital menu, the first version hides non-compliant menu items, and the second version shows the non-compliant menu items;

based on the reception of the initial selection, control display of the selected initial version of the digital menu to the user on a display of the device;

receive, from the device operated by the user and executing the software application, a subsequent selection, wherein the subsequent selection selects a subsequent version of the digital menu selected from the group consisting of the first version of the digital menu and the second version of the digital menu, and the initial selection is different from the subsequent selection; and based on the reception of the subsequent selection, remove the initial version of the digital menu from the display of the device and control display of the subsequent version of the digital menu on the display of the device for viewing by the user.

* * * * *